US007088782B2

(12) United States Patent
Mody et al.

(10) Patent No.: US 7,088,782 B2
(45) Date of Patent: Aug. 8, 2006

(54) TIME AND FREQUENCY SYNCHRONIZATION IN MULTI-INPUT, MULTI-OUTPUT (MIMO) SYSTEMS

(75) Inventors: Apurva N. Mody, Atlanta, GA (US); Gordon L. Stuber, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 898 days.

(21) Appl. No.: 10/128,821

(22) Filed: Apr. 24, 2002

(65) Prior Publication Data

US 2002/0181509 A1    Dec. 5, 2002

Related U.S. Application Data

(60) Provisional application No. 60/286,180, filed on Apr. 24, 2001, provisional application No. 60/286,130, filed on Apr. 24, 2001.

(51) Int. Cl.
  *H04K 1/10*    (2006.01)
(52) U.S. Cl. .................................................. 375/260
(58) Field of Classification Search ................ 375/260, 375/299, 347, 267; 370/208, 210, 209
  See application file for complete search history.

(56) References Cited

U.S. PATENT DOCUMENTS

| | | | | |
|---|---|---|---|---|
| 5,732,113 | A | | 3/1998 | Schmidl et al. ............. 375/355 |
| 5,867,478 | A | * | 2/1999 | Baum et al. ................. 370/203 |
| 6,088,408 | A | | 7/2000 | Calderbank et al. ........ 375/347 |
| 6,115,427 | A | | 9/2000 | Calderbank et al. ........ 375/267 |
| 6,125,149 | A | | 9/2000 | Jafarkhani et al. .......... 375/262 |
| 6,137,847 | A | * | 10/2000 | Stott et al. .................. 375/344 |
| 6,148,024 | A | * | 11/2000 | Ho et al. ..................... 375/222 |
| 6,185,258 | B1 | | 2/2001 | Alamouti et al. ........... 375/260 |
| 6,188,736 | B1 | | 2/2001 | Lo et al. ..................... 375/347 |
| 6,373,861 | B1 | * | 4/2002 | Lee ............................. 370/503 |
| 6,473,467 | B1 | * | 10/2002 | Wallace et al. ............. 375/267 |
| 6,792,035 | B1 | * | 9/2004 | Kontola ...................... 375/148 |
| 6,888,899 | B1 | * | 5/2005 | Raleigh et al. ............. 375/299 |
| 6,961,388 | B1 | * | 11/2005 | Ling et al. .................. 375/267 |
| 2002/0041635 | A1 | * | 4/2002 | Ma et al. ..................... 375/267 |
| 2002/0122381 | A1 | * | 9/2002 | Wu et al. .................... 370/208 |
| 2002/0154705 | A1 | * | 10/2002 | Walton et al. .............. 375/267 |

OTHER PUBLICATIONS

Mody, Apurva N. and Stuber, Gordon L., "Synchronization for MIMO OFDM Systems," School of Electrical and Computer Engineering, Georgia Institute of Technology, Atlanta, GA.

(Continued)

*Primary Examiner*—Emmanuel Bayard
(74) *Attorney, Agent, or Firm*—Thomas, Kayden, Horstemeyer & Risley, LLP

(57) ABSTRACT

In a communication system, and in particular a wireless Orthogonal Frequency Division Multiplexing (OFDM) communication system, the present invention provides systems for synchronizing data transmitted across a channel. The present invention may be used in a Multi-Input, Multi-Output (MIMO) system in which the data is transmitted from any number of transmitting antennas and received by any number of receiving antennas. The number of transmitting and receiving antennas does not necessarily have to be the same. Circuitry is provided for synchronizing the data in both the time domain and frequency domain. Time synchronization involves coarse time synchronization and fine time synchronization. Frequency synchronization involves coarse frequency offset estimation, fine frequency offset estimation, and frequency offset correction.

51 Claims, 9 Drawing Sheets

OTHER PUBLICATIONS

Mody, Apurva N. and Stuber, Gordon L., "Parameter Estimation for MIMO OFDM Systems," School of Electrical and Computer Engineering, Georgia Institute of Technology, Atlanta, GA.

Schmidle, Timothy M. and Cox, Donald C., "Robust Frequency and Timing Synchronization for OFDM," IEEE Transactions on Communications, vol. 45, No. 12, Dec. 1997, pp. 1613-1621.

Alamouti, Siavash M., "A Simple Transmit Diversity Technique for Wireless Communications," IEEE Journal on Select Areas in Communications, vol. 16, No. 8, Oct. 1998.

Li, Ye (Geoffrey), Seshadri, Nambirajan, and Ariyavisitakul, Sirikiat, "Channel Estimation for OFDM Systems with Transmitter Diversity in Mobile Wireless Channels," IEEE Journal on Selected Areas in Communications, vol. 17, No. 3, Mar. 1999.

Tarokh, Vahid, Jafarkhani, Hamid, and Calderbank, A. Robert, "Space-Time Block Coding for Wireless Communications: Performance Results," IEEE Journal on Selected Areas in Communications, vol. 17, No. 3, Mar. 1999.

Mody, Apurva N. and Stuber, Gordon L., "Efficient Training and Synchronization Sequence Structures for MIMO OFDM," School of Electrical and Computer Engineering, Georgia Institute of Technology, Atlanta, GA 30332 and Wi-LAN, Wireless Data Communications Inc., Atlanta, Georgia, pp. 1-7.

Tarokh, Vahhid, Jafarkhani Hamid, and Calderbank, A.R., "Space-Time Block Codes from Orthogonal Designs," IEEE Transactions on Information Theory, vol. 45, No. 5, Jul. 1999.

* cited by examiner

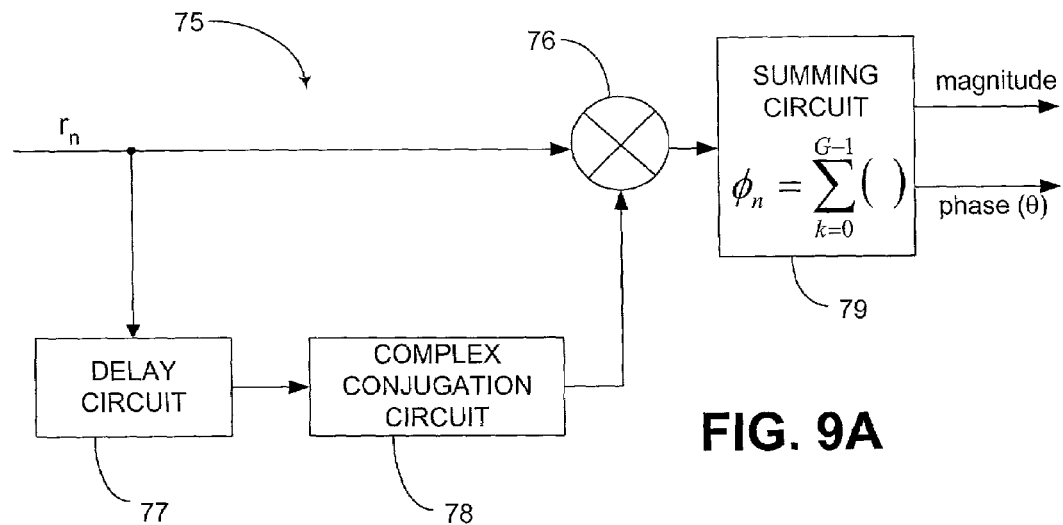
FIG. 9A
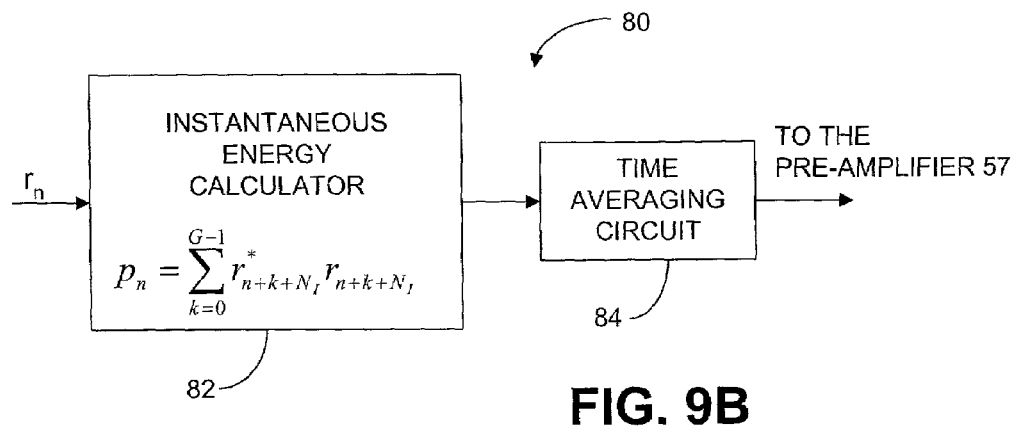
FIG. 9B
FIG. 10

TIME AND FREQUENCY SYNCHRONIZATION IN MULTI-INPUT, MULTI-OUTPUT (MIMO) SYSTEMS

CROSS-REFERENCE TO RELATED APPLICATIONS

This application claims priority to copending U.S. provisional application entitled, "Synchronization for MIMO OFDM Systems," having Ser. No. 60/286,180, filed Apr. 24, 2001, which is entirely incorporated herein by reference.

This application is related to copending U.S. provisional application entitled "Parameter Estimation for MIMO OFDM Systems," having Ser. No. 60/286,130, filed on Apr. 24, 2001, which is entirely incorporated herein by reference.

TECHNICAL FIELD OF THE INVENTION

The present invention is generally related to wireless communication systems that employ Orthogonal Frequency Division Multiplexing (OFDM) and, more particularly, to an apparatus and method for providing time and frequency synchronization in a Multi-Input, Multi-Output (MIMO) OFDM system.

BACKGROUND OF THE INVENTION

In wireless communication systems, recent developments have been made using technologies wherein multiple signals are simultaneously transmitted over a single transmission path. In Frequency Division Multiplexing (FDM), the frequency spectrum is divided into sub-channels. Information (e.g. voice, video, audio, text, etc.) is modulated and transmitted over these sub-channels at different sub-carrier frequencies.

In Orthogonal Frequency Division Multiplexing (OFDM) schemes, the sub-carrier frequencies are spaced apart by precise frequency differences. Because of the ability of OFDM systems to overcome the multiple path effects of the channel, and to transmit and receive large amounts of information, much research has been performed to advance this technology. By using multiple transmitting antennas and multiple receiving antennas in OFDM systems, it is possible to increase the capacity of transmitted and received data while generally using the same amount of bandwidth as in a system with one transmit and one receive antenna.

OFDM technologies are typically divided into two categories. The first category is the Single-Input, Single-Output (SISO) scheme, which utilizes a single transmitting antenna to transmit radio frequency (RF) signals and a single receiving antenna to receive the RF signals. The second category is the Multi-Input, Multi-Output (MIMO) scheme, which uses multiple transmitting antennas and multiple receiving antennas.

In typical communication systems, training symbols, or preamble, at the beginning of data frames, are usually added as a prefix to the data symbols. The data symbols, of course, include the useful data or information (e.g., voice, data, video, etc.), which is meant to be transmitted to a remote location. The training symbols in SISO systems are used to provide synchronization of the received signals with respect to the transmitted signals, as well as to provide channel parameter estimation.

Although training symbols used for SISO systems can be used to provide synchronization in a MIMO system, the training symbols cannot provide for channel parameter estimation in the MIMO system. In fact, no method or apparatus exists for MIMO systems that are capable of providing time and frequency synchronization as well as channel parameter estimation. Thus, a need exists for a method and apparatus that is capable of providing time and frequency synchronization in MIMO systems and can further perform channel estimation.

SUMMARY OF THE INVENTION

The present invention provides systems and methods that overcome the deficiencies of the prior art as mentioned above. The present invention utilizes a sequence of training symbols or preambles that may be used in both Single-Input, Single-Output (SISO) and Multi-Input, Multi-Output (MIMO) systems, using any number of transmitting and receiving antennas. Also, the present invention can be used to synchronize a received data frame with a transmitted data frame in a MIMO system in both the time domain and frequency domains. In order to make MIMO systems operational, synchronization is essential. However, no scheme has been developed which is capable of time and frequency synchronization in MIMO systems. The present invention achieves synchronization in the time domain and frequency domain and, therefore, enables MIMO systems to operate acceptably.

One MIMO Orthogonal Frequency Division Multiplexing (OFDM) system of the present invention includes a number of OFDM modulators, which provide data frames to be transmitted across a channel. The data frames of the present invention comprise one or more training symbols, a plurality of data symbols, and cyclic prefixes inserted between the data symbols. A number of transmitting antennas corresponding to the number of modulators is used to transmit the modulated signals over the channel. A number of receiving antennas is used to receive the transmitted signals. The received signals are demodulated by a number of OFDM demodulators corresponding to the number of receiving antennas and decoded by an OFDM decoder, which processes the data frames. By utilizing the structure embedded in the training symbols, the MIMO system of the present invention is capable of providing time and frequency synchronization as well as perform channel estimation.

A method of the present invention is also provided, wherein synchronization is carried out in the time and frequency domains in a MIMO system. The method includes producing data frames comprising at least one training symbol, multiple data symbols and cyclic prefixes. The data frames are transmitted over the channel, received, and demodulated and processed. By processing the training symbol of the data frame, the data frame can be synchronized in both the time and frequency domains.

Other systems, methods, features, and advantages of the present invention will become apparent to a person having skill in the art upon examination of the following drawings and detailed description. All such additional systems, methods, features, and advantages are within the scope of the present invention.

BRIEF DESCRIPTION OF THE DRAWINGS

Many aspects of the invention can be better understood with reference to the following drawings. Moreover, in the drawings, like reference numerals designate corresponding parts throughout the several views.

FIGS. 9A and 9B are block diagrams illustrating example embodiments of the coarse time synchronization circuit shown in FIG. 8.

FIG. 10 is a block diagram illustrating an example embodiment of the first frequency offset estimation circuit shown in FIG. 8.

DETAILED DESCRIPTION OF THE PREFERRED EMBODIMENT

Figure 1:
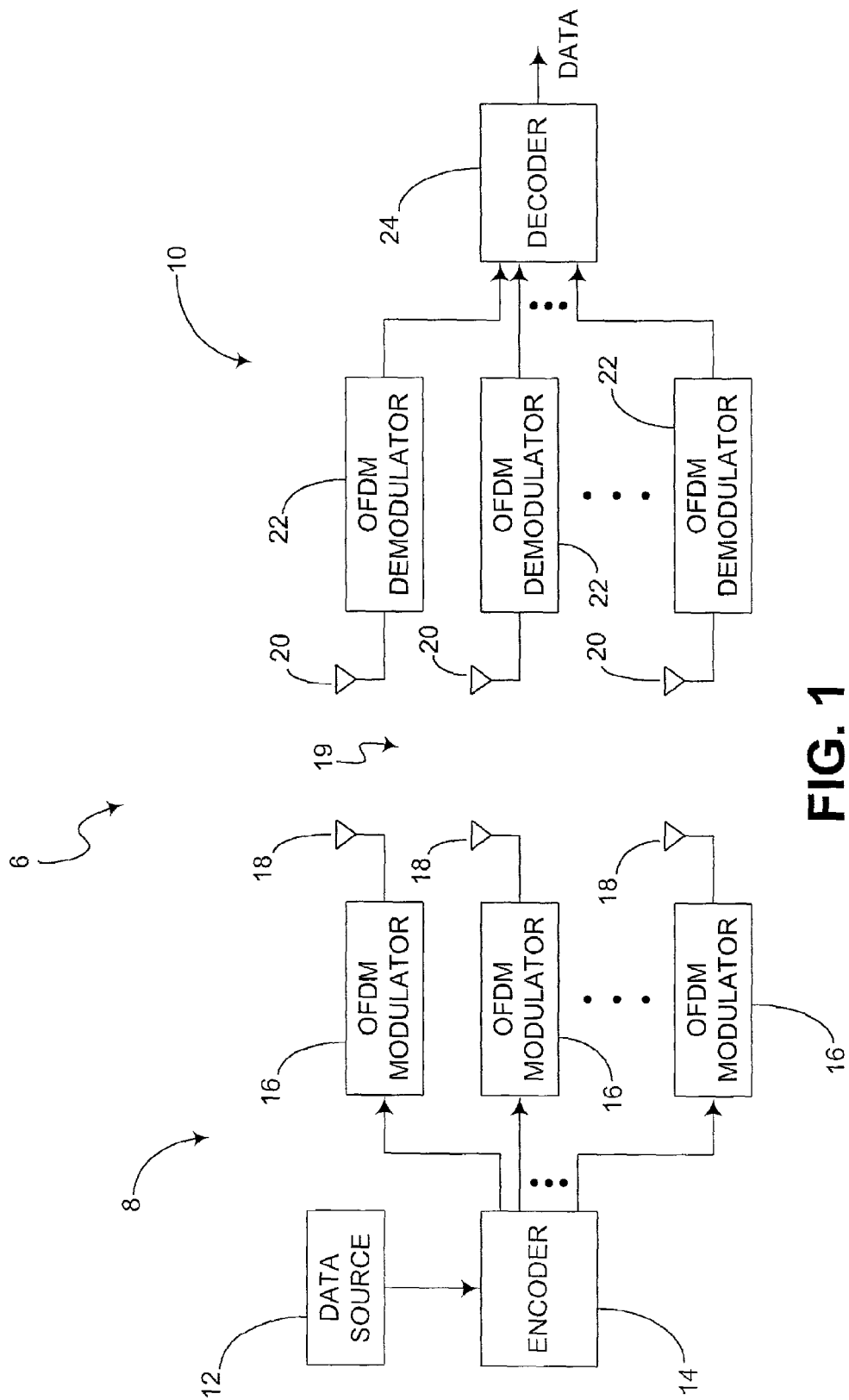
FIG. 1 is a block diagram illustrating an example embodiment of a Multi-Input, Multi-Output (MIMO) Orthogonal Frequency Division Multiplexing (OFDM) system.

In FIG. 1, an example embodiment of a Multi-Input, Multi-Output (MIMO) Orthogonal Frequency Division Multiplexing (OFDM) communication system 6 of the present invention is shown. The communication system 6 in this example embodiment may be implemented as a wireless system for the transmission and reception of data across a wireless channel 19. The communication system 6, for example, may be part of a wireless Local Area Network (LAN) system or wireless Metropolitan Area Network (MAN) system, cellular telephone system, or other type of radio or microwave frequency system incorporating either one-way or two-way communication over a range of distances. The communication system 6 may transmit in a range from 2 to 11 GHz, for example, such as in the unlicensed 5.8 GHz band using a bandwidth of about 3–6 MHz.

It is also possible for the present invention to be used in a system that comprises an array of sub-channel communication links that carry a number of signals transmitted by a number of transmitting elements to each of a number of receiving elements. In this latter case, communication links, such as wires in a wiring harness or some alternative wired transmission system, for example, could be used over the distance between a data source and a receiver.

In the example embodiment of FIG. 1, a transmitter 8 transmits signals across the wireless channel 19 and a receiver 10 receives the transmitted signals. The transmitter 8 comprises a data source 12, which provides the original binary data to be transmitted from the transmitter 8. The data source 12 may provide any type of data, such as, for example, voice, video, audio, text, etc. The data source 12 applies the data to an encoder 14, which encodes the data to allow for error correction. The encoder 14 further processes the data so that certain criterion for space-time processing and OFDM are satisfied. The encoder 14 separates the data onto multiple paths in the transmitter 8, each of which will hereinafter be referred to as a transmit diversity branch (TDB). The separate TDBs are input into OFDM modulators 16, each of which modulates the signal on the respective TDB for transmission by the transmitting antennas 18. The present invention may be used in a Single-Input, Single-Output (SISO) system, which may be considered as a special case of MIMO wherein the number of transmitting and receiving antennas is one. In the SISO system example, separation of the data by the encoder 14 is not necessary since only one OFDM modulator 16 and antenna 18 is used.

During the encoding by the encoder 14 and modulating by the OFDM modulators 16, data is normally bundled into groups such that the collection of each group of data is referred to as a "frame." Details of the frame as used in the present invention will be described in more detail below with reference to FIG. 4. Each frame along each TDB is output from a respective OFDM modulator 16. As illustrated in FIG. 1, any number of OFDM modulators 16 may be used. The number of OFDM modulators 16 and respective transmitting antennas 18 may be represented by a variable "Q." The OFDM modulators 16 modulate the respective frames at specific sub-carrier frequencies and respective transmitting antennas 18 transmit the modulated frames over the channel 19.

On the side of the receiver 10, a number "L" of receiving antennas 20 receives the transmitted signals, which are demodulated by a number L of respective OFDM demodulators 22. The number L may represent any number and is not necessarily the same as the number Q. In other words, the number Q of transmitting antennas 18 may be different from the number L of receiving antennas 20, or they may alternatively be the same. The outputs of the demodulators 22 are input into a decoder 24, which combines and decodes the demodulated signals. The decoder 24 outputs the original data, which may be received by a device (not shown) that uses the data.

The communication system 6 may comprise one or more processors, configured as hardware devices for executing software, particularly software stored in computer-readable memory. The processor can be any custom made or commercially available processor, a central processing unit (CPU), an auxiliary processor among several processors associated with a computer, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, a 68xxx series microprocessor from Motorola Corporation, or a 67xxx series Digital Signal Processor from the Texas Instruments Corporation.

When the communication system 6 is implemented in software, it should be noted that the communication system 6 can be stored on any computer-readable medium for use by or in connection with any computer-related system or method. In the context of this document, a computer-readable medium is an electronic, magnetic, optical, or other physical device or means that can contain or store a computer program for use by or in connection with a computer related system or method. The communication system 6 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. Examples of the computer-readable medium include the following: an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the communication system 6 is implemented in hardware, the communication system can be implemented with any or a combination of the following technologies, which are each well known in the art: one or more discrete logic circuits having logic gates for implementing logic functions upon data signals, an application specific integrated circuit (ASIC) having an appropriate combination of logic gates, a programmable gate array (PGA), a field programmable gate array (FPGA), etc.

Figure 2:
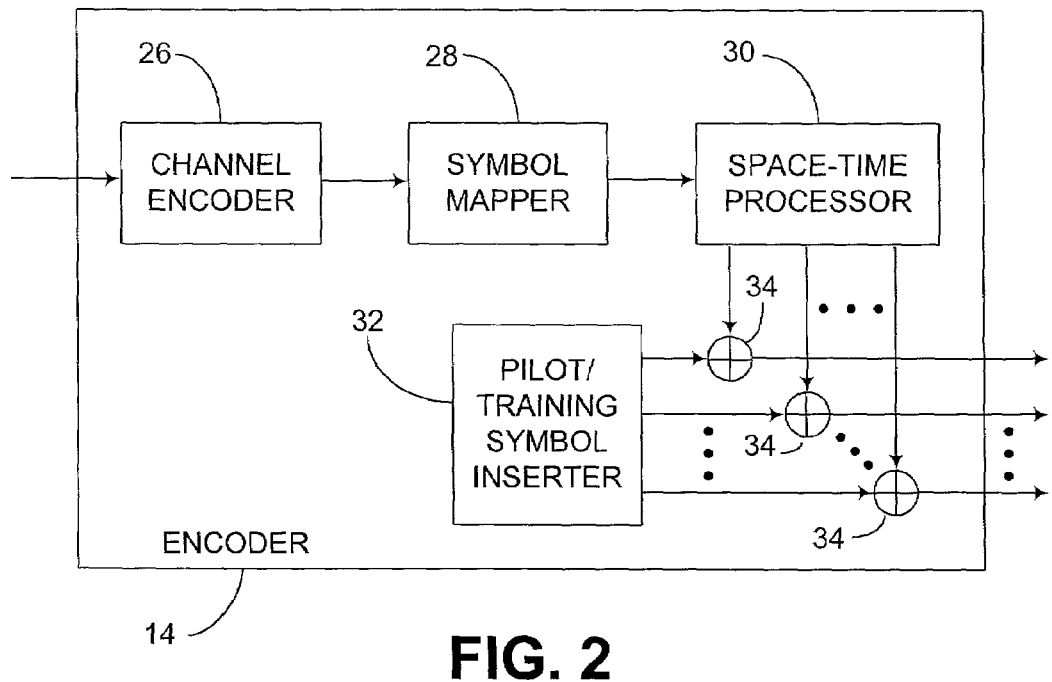
FIG. 2 is a block diagram illustrating an example embodiment of the MIMO encoder shown in FIG. 1.

The encoder 14 and OFDM modulators 16 of the transmitter 8 will now be described with respect to FIGS. 2 and 3. FIG. 2 shows details of an example embodiment of the encoder 14 shown in FIG. 1. The encoder 14 may be configured such that data from the data source 12 is encoded by a channel encoder 26, which adds parity to the original data to produce channel encoded data. The channel encoder 26 encodes the data using a scheme that is recognized by the decoder 24 of the receiver 10 and enables the decoder 24 to detect errors in the received data. Errors may arise as a result of environmental conditions of the channel 19 or noise inadvertently added by the transmitter 8 or receiver 10.

The encoder 14 further includes a symbol mapper 28, which maps the channel-encoded data into data symbols. The symbol mapper 28 groups a predetermined number of bits such that each group of bits constitutes a specific symbol chosen from a pre-determined alphabet. The symbol mapper 28 further lays out a stream of data symbols within the structure of a frame.

The encoder 14 further includes a space-time processor 30 that processes the data symbol stream received from the symbol mapper 28 and outputs the processed data symbols via the respective TDBs. The space-time processor 30 encodes the data symbol stream in a manner such that the receiver 10 is capable of decoding the signals. The data symbols in the TDBs are distributed over Q lines that will eventually be transmitted at precise frequencies spaced apart from each other by a predetermined difference in frequency. By providing a specific frequency difference between the multiple sub-channels, orthogonality can be maintained, thereby preventing the OFDM demodulators 22 from picking up frequencies other than their own designated frequency.

Each TDB provides an input to a respective adder 34. The other input into each of the adders 34 is connected to the output of a pilot/training symbol inserter 32, which provides pilot symbols and training symbols to be inserted into the frames on the TDBs. Symbols inserted periodically within the data symbols will be referred to herein as "pilot symbols." These periodic pilot symbols may be inserted anywhere in the stream of the data symbols. If a continuous burst of symbols is inserted by the pilot/training symbol inserter 32, this type of symbol will be referred to herein as "training symbols" which constitute the preamble. The training symbols preferably are inserted at the beginning of the frame. However, the training symbols may be inserted onto the frame in a location other than at the beginning of the frame, such as at the end or in the middle of the frame.

The pilot/training symbol inserter 32 may be configured so that it is capable of storing multiple sets of training symbols or pilot symbols. In this case, a particular set may be selected, for example, based on desirable communication criteria established by a user. The training symbols for each respective sub-channel may preferably be unique to the particular sub-channel. In order to accommodate amplitude differences between the sub-channels, the training symbols may be designed and adjusted to maintain a constant amplitude at the output of each sub-channel.

Training symbols are preferably transmitted once for every frame. Training symbols are used for periodic calibration (synchronization and channel parameter estimation) whereas pilot symbols are used for minor adjustments to deal with the time-varying nature of the channel. The training symbols may be indicative of calibration values or known data values. These calibration values or known values may be transmitted across the channel, and used to calibrate the communication system 6. Any necessary refinements may be made to the communication system 6 if the received calibration values do not meet desirable specifications.

Furthermore, the training symbols may be used as specific types of calibration values for calibrating particular channel parameters. By initially estimating these channel parameters, offsets in the time domain and frequency domain may be accounted for so as to calibrate the communication system 6. The training sequence may or may not bypass an Inverse Discrete Fourier Transform (IDFT) stage 38, which is a part of the embodiment of the OFDM modulator 16 of FIG. 3. A training sequence that bypasses the IDFT stage 38 and is directly input into a digital to analog converter (DAC) 44 is referred to herein as a directly modulatable training sequence. Examples of such training sequences may be "chirp-like" sequences. These sequences cover each portion of the bandwidth used by the communication system 6. Hence, channel response can be easily determined. In general, a chirp sequence in the time domain is given by the equation:

$$s_n = \cos\left(\frac{\pi n^2}{N}\right) + j\sin\left(\frac{\pi n^2}{N}\right), \quad n = 0, 1, \ldots, N-1,$$

where j is given by $\sqrt{-1}$ and is used to denote the quadrature component of the signal. It should be noted that the term $s_n$ refers to a time domain signal on the side of the transmitter 8. Frequency domain signals on the transmitter side will hereinafter be referenced by capital letters $S_k$. Time and frequency domain signals on the receiver side will hereinafter be written as $r_n$ and $R_k$, respectively. Other modifications of the chirp-like sequence may be Frank-Zadoff sequences, Chu sequences, Milewski sequences, Suehiro polyphase sequences, and sequences given by Ng et al. By observing the response of the receiver 10 to the chirp signals, the channel parameters may be estimated.

In the case when the IDFT stage 38 is not bypassed, a training sequence may be generated by modulating each of the symbols on the TDBs with a known sequence of symbols in the frequency domain and passing the symbols through the IDFT stage 38. Generally, such a known sequence of symbols is obtained from an alphabet which has its constituents on the unit circle in the complex domain and such that the resultant sequence in the time domain has a suitable Peak to Average Power Ratio (PAPR). An alphabet in communication systems is defined as a finite set of complex values that each of the symbols can assume. For example, an alphabet of a binary phase shift keying (BPSK) system consists of values +1 and −1 only. An alphabet for a quaternary phase shift keying (QPSK) system consists of the values 1+j, −1+j, 1−j, and −1−j. For example, the training sequence may be generated by modulating each of the tones of the OFDM block using a BPSK alphabet, which consists of symbols +1 and −1. The synchronization scheme may be very general such that any known sequence having suitable properties, such as low PAPR, may be used to form the training sequence.

With reference again to FIG. 2, the adders 34 add the training symbols and pilot symbols to the frame. Other embodiments may be used in place of the adders 34 for combining the training symbols and pilot symbols with the data symbols in the frame. Furthermore, the adders 34 may include additional inputs to allow for flexibility when adding the pilot/training symbols or in the combining of multiple training symbols or even selectable training symbols. After the training symbols are inserted into frames on the respective TDBs, the frames are output from the encoder 14 and input in respective OFDM modulators 16.

Figure 3:
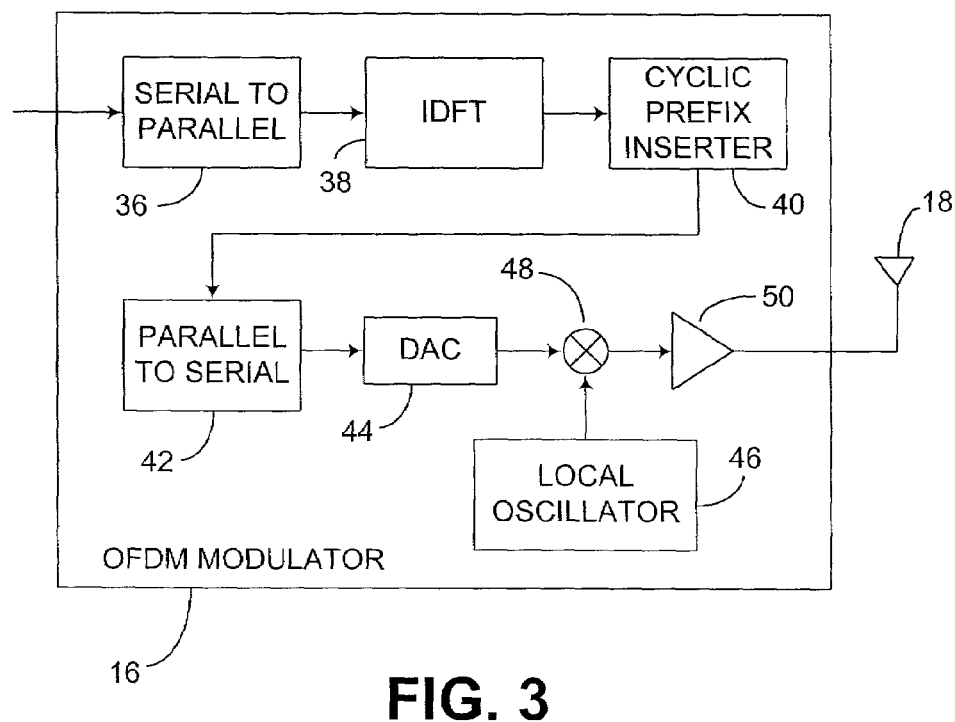
FIG. 3 is a block diagram illustrating an example embodiment of one of the OFDM modulators shown in FIG. 1.

FIG. 3 shows an example embodiment of an OFDM modulator 16, which receives signals along one of the TDBs. The number of OFDM modulators 16 is preferably equal to the number of transmitting antennas 18. In SISO systems, there is only one OFDM modulator 16 and one transmitting antenna 18. In MIMO systems, there may be any number of OFDM modulators 16 and transmitting antennas 18.

The respective signal from the encoder 14 is input into a serial-to-parallel converter 36 of the OFDM modulator 16. The serial-to-parallel converter 36 takes N symbols received in a serial format and converts them into a parallel format. The variable N will be referred to herein as the blocksize of the OFDM symbol. The N parallel symbols are processed by an Inverse Discrete Fourier Transform (IDFT) stage 38, which transforms the frequency signals to the time domain. The N number of transformed symbols in the time domain will be referred to herein as samples.

A method is proposed herein to design the training symbols such that the transforms of all the sequences from the IDFT stage 38 will have a constant magnitude. By maintaining a constant magnitude at the output of each of the IDFT stages 38 within their respective modulators, one of the main problems of OFDM, i.e., peak to average power ratio (PAPR), is solved. The receiver 10 can thus more accurately estimate the channel parameters, which are used by the receiver 10 to synchronize the received signals in the time and frequency domains, as will be described below in more detail.

The output from the IDFT stage 38 is input into a cyclic prefix inserter 40, which inserts an additional number of samples for every N samples. The number of samples inserted by the cyclic prefix inserter 40 will be referred to herein by the variable "G." The G samples are intended to be inserted as guard intervals to separate the N adjacent data symbols from each other in time by a separation adequate to substantially eliminate Inter Symbol Interference (ISI). The cyclic prefix inserter 40 repeats G samples from a latter portion of the N samples output from the IDFT stage 38 and inserts the G samples as a prefix to each of the data samples. Preferably, the time length of the cyclic prefix is greater than the maximum time delay of a transmitted signal across the channel 19. Since the nature of the channel 19 may be susceptible to a variation in the delay time from the transmitted antennas 18 to the receiving antennas 20, it may be desirable to increase, or even double, the length of cyclic prefixes of the preamble to ensure that the time delay of the channel does not exceed the time of the cyclic prefix, thereby eliminating ISI.

The G+N samples, herein referred to as an OFDM symbol, are then converted from a parallel format to a serial format using parallel-to-serial converter 42, and then inputted to a digital-to-analog converter (DAC) 44 for conversion into analog signals. The output from the DAC 44 is input into a mixer 48. A local oscillator 46 provides a signal having the carrier frequency to the other input of the mixer 48 to up-convert the respective OFDM symbol from baseband to RF.

After the respective frame has been mixed with a carrier frequency that is set by the respective local oscillator 46, the frame is amplified by an amplifier 50. As indicated above, one of the drawbacks to any OFDM signal is that it generally has a high PAPR. To accommodate this drawback, the amplifier 50 may be backed off to prevent it from going into its non-linear region. However, the present invention may provide certain specific sequences that can be used in order to make the PAPR minimal or unity.

Each OFDM modulator 16 preferably comprises the same components as the OFDM modulator 16 shown in FIG. 3. Other techniques for designing the OFDM modulators 16 may be used in order to transmit the multiple frames across the channel 19 with minimal interference. Each frame output from the respective OFDM modulator 16 is transmitted by a respective antenna 18. The antennas 18 may be spaced apart from each other by any desirable separation. For example, the separation distance may be in a range from a few millimeters to several meters.

Figure 4:
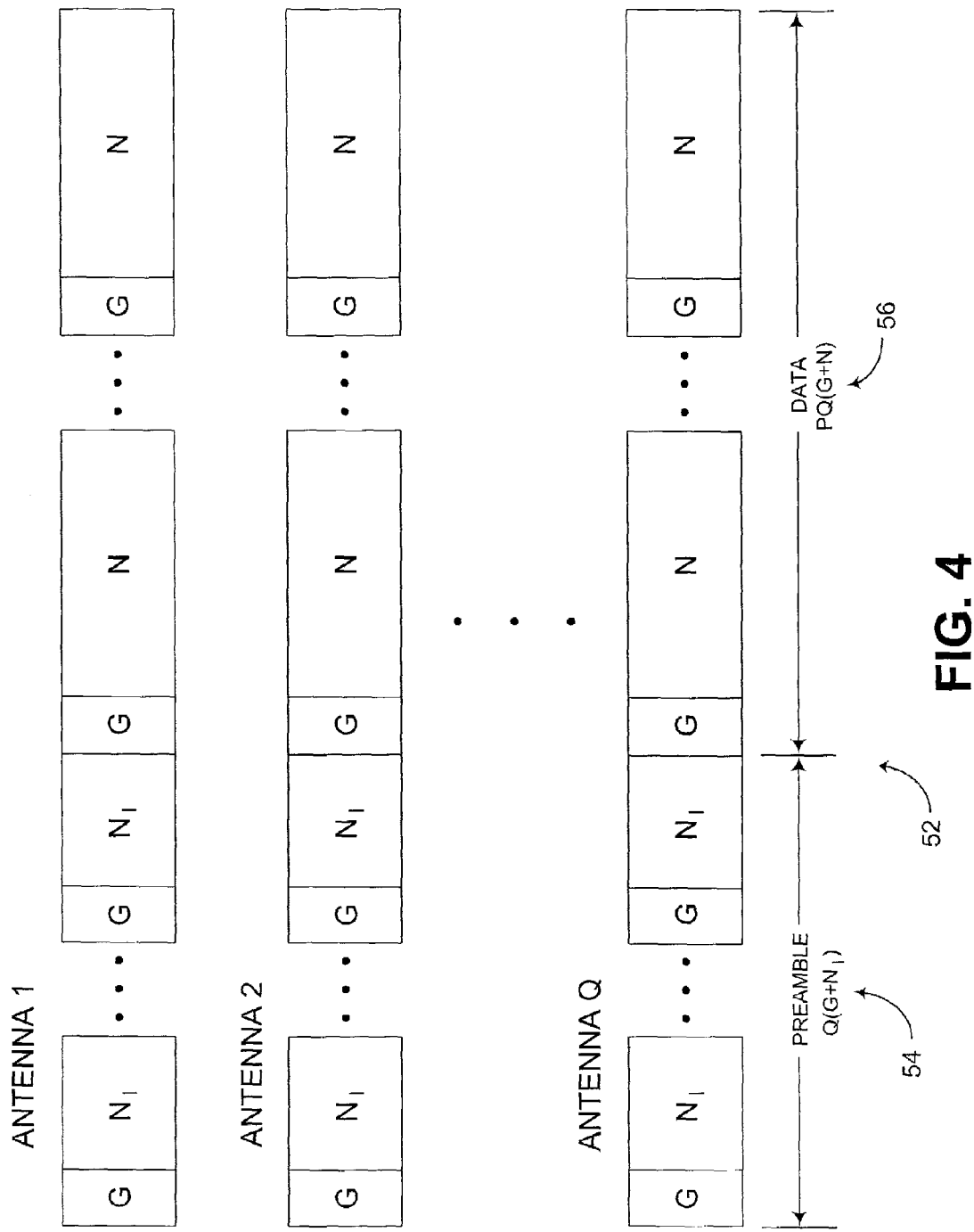
FIG. 4 illustrates an example frame structure for a MIMO OFDM system.

FIG. 4 illustrates an example of a frame 52 that is transmitted across the channel 19 from the transmitting antennas 18 to the receiving antennas 20. The frame 52 comprises a preamble 54 comprising a number of training symbols $N_I$ and cyclic prefixes G. The preamble 54 is inserted by the pilot/training symbol inserter 32 as mentioned above. In addition, the data frame 52 comprises a data portion 56 consisting of a plurality of OFDM data symbols N and cyclic prefixes G, which are inserted before each of the OFDM data symbols N. As previously mentioned, the pilot/training symbol inserter 32 further inserts pilot symbols (not shown) intermittently within the OFDM data symbols N. The task of the preamble 54 and training symbols $N_I$ in the frame is to help the receiver 10 identify the arrival of the frame 52 and hence perform time synchronization, frequency synchronization, and channel parameter estimation.

The preamble 54, in general, consists of Q or more training symbols, wherein each training symbol has a length of G+N_I samples in time. The number of samples $N_I$ is established as a certain fraction of the number of data samples N in an OFDM block such that $N_I=N/I$, where I is an integer, such as 1, 2, 4 . . . For example, $N_I$ may be ¼ N. If no predetermined $N_I$ has been established, the variable $N_I$ may be given the value equal to N. The training symbol length may be shorter than the length of the symbols in the data portion 56, which has a length of G+N samples.

Figure 5:
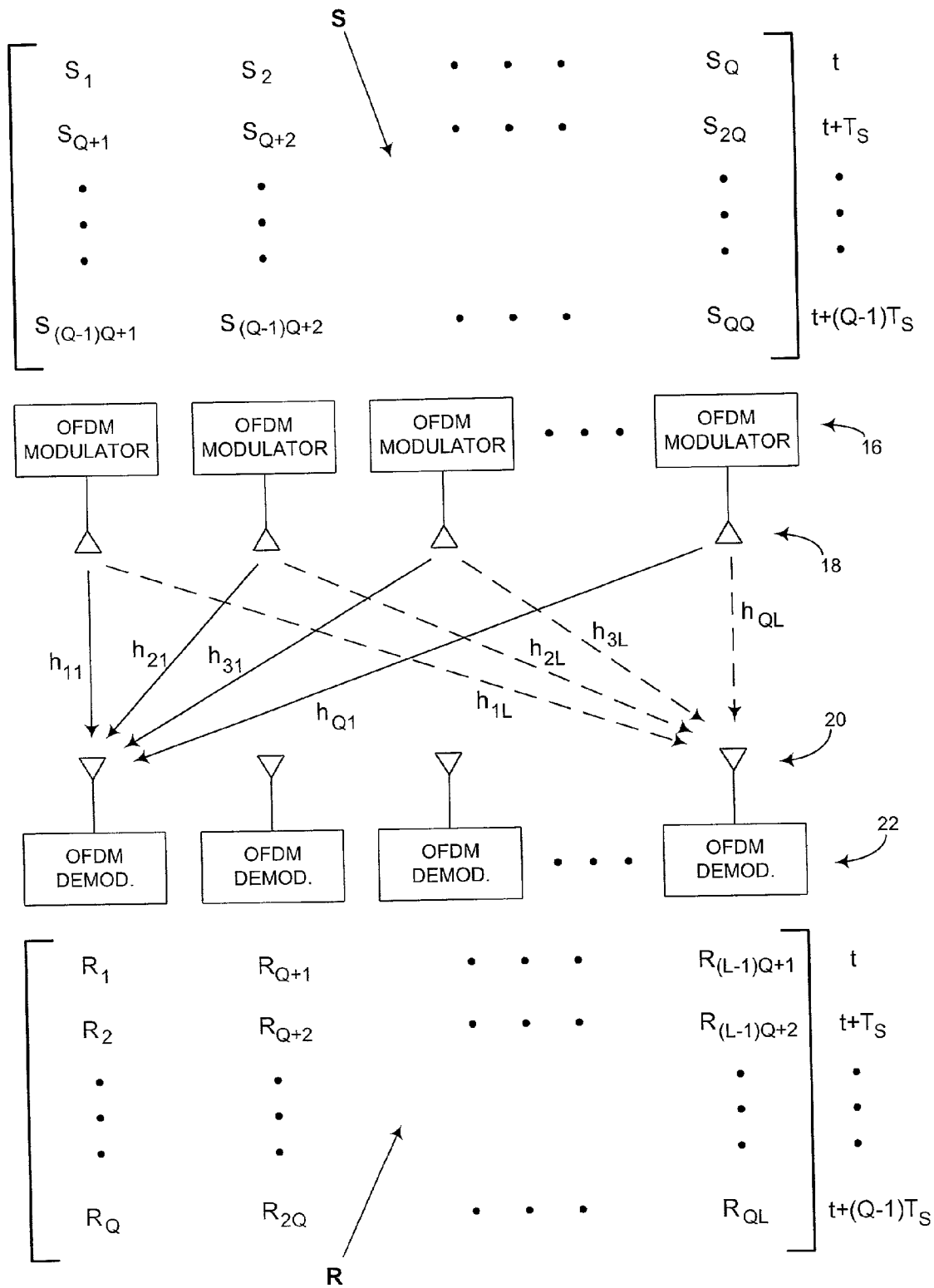
FIG. 5 is a block diagram illustrating an example matrix of a transmitted sequence structure and an example matrix of a received sequence structure using the modulator/demodulator arrangement shown in FIG. 1.

FIG. 5 shows a portion of the MIMO OFDM communication system 6 of FIG. 1 along with details of a signal transmission matrix S and a received demodulated OFDM sample matrix R. The signals of the communication system 6 can be expressed using the equation:

$$R_{k,T\times L} = S_{k,T\times Q}\eta_{k,Q\times L} + W_{k,T\times L}$$

where R is a T×L received demodulated OFDM sample matrix, η is a Q×L matrix of channel coefficients that are indicative of the characteristics of the channel across which the signals are transmitted, S is a TX Q signal transmission matrix, and W is a T×L noise matrix that corrupts and distorts the received sample matrix R. In general, T may or may not be equal to Q and does not affect the synchronization procedure. Hence, for simplicity, the assumption is made herein that T is equal to Q.

The signal transmission matrix S shown in FIG. 5 consists of Q OFDM symbols that are simultaneously transmitted from Q transmit antennas 18 over Q or more OFDM symbol periods ($T_s$). For example, at a first time instance t, the OFDM symbols $S_1, S_2, \ldots S_Q$ are transmitted from the first to the Qth antennas 18. At a second time instance t+$T_S$, the OFDM symbols $S_{Q+1}, S_{Q+2}, \ldots S_{2Q}$ are transmitted from the same antennas 18. The OFDM symbol transmissions are repeated at each time instance until all of the OFDM symbols of the matrix S have been transmitted.

During the transmission of training symbols in an initial calibration mode, the S matrix consists of Q or more training symbols, each of which is less than or equal to the length of an OFDM symbol in the time dimension. The training symbols are simultaneously transmitted from the transmitting antennas 18 as represented by equations (1) and (2), wherein the different antennas correspond to the space dimension.

During the transmission of the data symbols, after the communication system 6 has been calibrated, the S matrix consists of Q or more data symbols each occupying an OFDM symbol in the time dimension. The pilot/training symbol inserter 32 inserts the pilot symbols within the data symbols. The data symbols are encoded, modulated, and transmitted from the transmitting antennas 18.

Each signal transmission matrix S of Q×Q OFDM symbols are transmitted over the communication channel 19, which naturally comprises a matrix of channel coefficients η. Typically, the communication channel 19 includes characteristics that distort and degrade the transmitted signal. In addition to the distortion and degradation of the transmitted signal, the communication system adds noise terms represented by the matrix W, before the signal transmission matrix S is received at the L receive antennas 20. The addition of noise further degrades the system performance.

FIG. 5 further illustrates how each of the L receiving antennas 20 receives each of the Q transmitted signals. For example, the first receive antenna 20 receives OFDM signals over channel impulse responses $h_{1I}, h_{2I}, h_{3I} \ldots h_{QI}$ from the first to the Qth transmitting antennas 18, respectively. The term $h_{i,j}$ refers to the channel impulse response from the $i^{th}$ transmit to the $j^{th}$ receive antenna in the time domain. The last receive antenna 20 receives the transmitted signals over the channel impulse responses $h_{1L}, h_{2L}, h_{3L}, \ldots h_{QL}$ from the first to the Qth transmitting antennas 18, respectively. For simplicity, only the signals received at the first and last receiving antennas 20 are shown. However, it should be understood that each receiving antenna 20 receives the signals transmitted from the Q transmitting antennas 18.

The received signals are demodulated by the respective OFDM demodulators 22, which provide the received demodulated OFDM sample matrix R. At a time instance t, the samples $R_1, R_{Q+1}, \ldots R_{(L-1)Q+1}$ are received. At a next time instance t+Ts, the samples $R_2, R_{Q+2} \ldots R_{(L-1)Q+2}$ are received. The samples are received at each time instance until all of the samples in the received demodulated OFDM sample matrix R are received. It should be noted that the time instances used for the matrices S and R are given the same variable, but, in essence, a delay occurs as is well known in the art.

A significant task of the receiver 10 is to estimate the time of arrival of the transmitted signal. This process is called "time synchronization." In addition to time synchronization, OFDM systems typically require frequency synchronization as well. Because there usually exists a certain difference between the local oscillator frequencies of the transmitter and the receiver, the received signals experience a loss of sub-carrier orthogonality, which should typically be corrected in order to avoid degradation in system performance.

Figure 6:
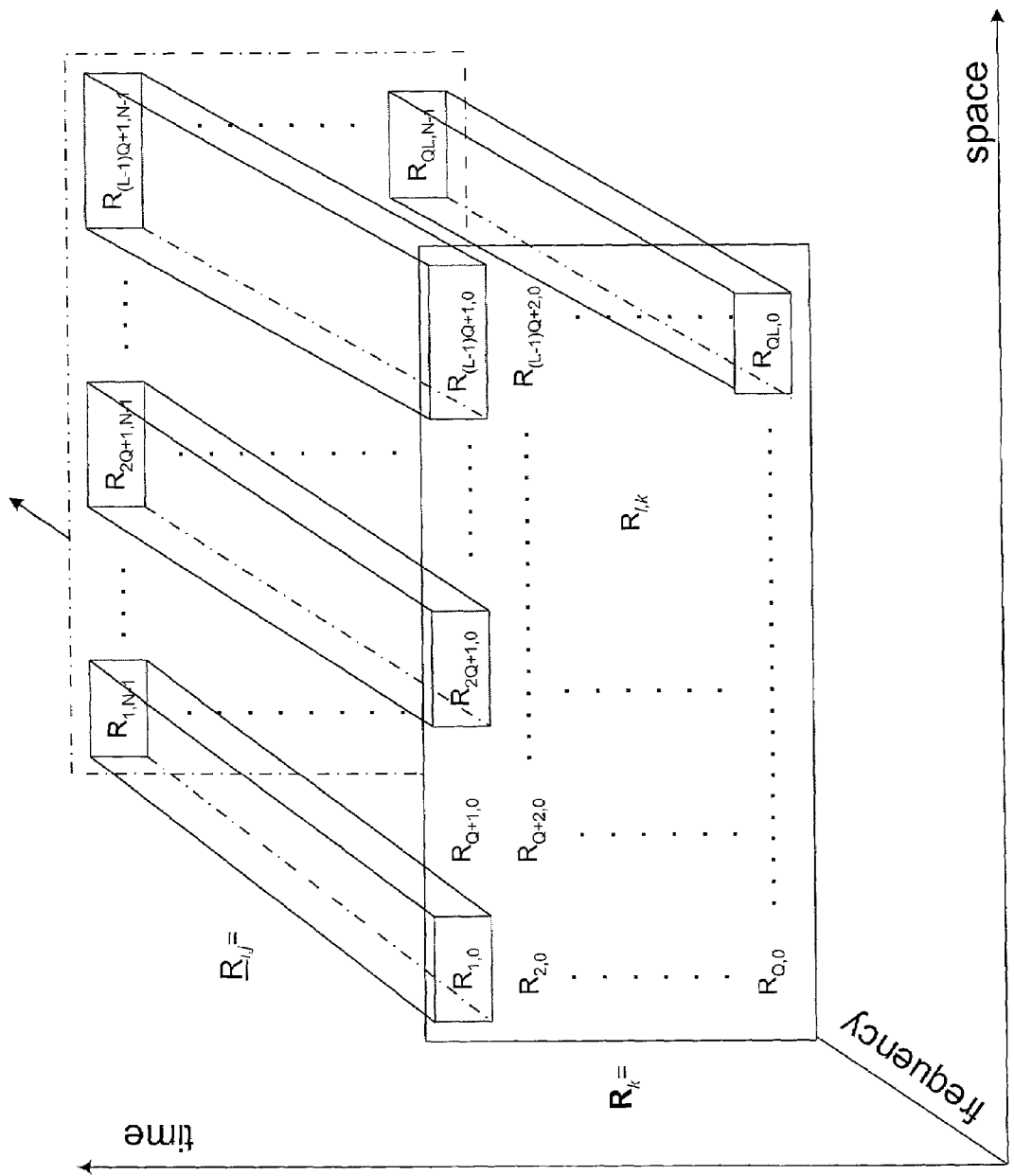
FIG. 6 illustrates a three-dimensional representation of the received sequence structure in detail.

FIG. 6 shows a detailed illustration of the received demodulated OFDM sample matrix R which consists of L columns and Q or more rows of OFDM symbols with respect to space and time, respectively. As shown, the matrix R consists of three dimensions, namely space, time and frequency. The frequency axis indicates the amplitude of the frequency component received at each receiving antenna 20 from each transmitting antenna 18. Each of the matrices R and η can be seen to consist of N matrices of dimension Q×L or Q×L vectors of length N.

In general, the training symbol length may be equal to the data symbol length. However, it is not necessary for the length of the training symbol in the preamble to be (N+G) since it is possible to estimate the characteristics of the channel even if the training symbol length is shortened to $N_I$+G such that ($N_I$+G)<(N+G). The variable $N_I$ may be set so as to establish a range of frequencies that may be estimated. For example, if $N_I$=N/4, then a frequency offset of 4 sub-carrier spacings can be estimated using the training symbol. However, the range to be established may depend upon the characteristics of the channel to be estimated also.

Transmission of the training sequence of length $N_I$ corresponds to exciting every Ith sub-channel of an OFDM signal having a block size N. This means that no information is transmitted on the remaining (1−1/I)N sub-channels and the estimates of the channel for the sub-channels are derived from the ones that actually include information. This may result in a poor performance and hence it is left to the system designer to determine the length of the preamble.

The sub-channels of the transmit sequence that bear no information are said to be zero-padded. Alternatively, the training sequence of length $N_I$ may be generated by first modulating every Ith sub-channel of the OFDM block by a known sequence of symbols and zero padding the rest. An N-point IDFT is taken to obtain N samples in the time domain, and finally only the first $N_I$ samples along with its cyclic prefix are transmitted. At the receiver after synchronization, the samples corresponding to the training sequence of length $N_I$ are repeated I times before being demodulated by the OFDM demodulators. In a number of alternative systems, many more sub-channels are zero padded to reduce the interference between the adjacent bands and to facilitate the system implementation. For example, in the systems based on the IEEE 802.16a/b standard, a total of 56 tones or sub-carriers are zero padded.

The training sequence structure in the frequency domain is represented by its signal transmission matrix, which is configured in such a way so as to have certain properties that aid in synchronization and channel estimation. For example, the signal transmission matrix for a 2×2 system may be of the form:

$$S_k = \begin{bmatrix} S_{1,k} & S_{1,k} \\ -S_{1,k}^* & S_{1,k}^* \end{bmatrix}, \quad (1)$$

where * denotes a complex conjugate operation, and k is a sub-carrier or sub-channel index. The signal transmission matrix S for a 4×4 system may be of the form:

$$S_k = \begin{bmatrix} S_{1,k} & S_{1,k} & S_{1,k} & S_{1,k} \\ -S_{1,k} & S_{1,k} & -S_{1,k} & S_{1,k} \\ -S_{1,k} & S_{1,k} & S_{1,k} & -S_{1,k} \\ -S_{1,k} & -S_{1,k} & S_{1,k} & S_{1,k} \end{bmatrix}, \quad (2)$$

where $S_1$ is the sequence in the frequency domain that has certain properties that satisfy the system requirements. Similarly, the signal transmission matrix S for a 3×3 system may be of the form:

$$S_k = \begin{bmatrix} S_{1,k} & S_{2,k} & \dfrac{S_{3,k}}{\sqrt{2}} \\ -S_{2,k}^* & S_{1,k}^* & \dfrac{S_{3,k}}{\sqrt{2}} \\ \dfrac{S_{3,k}^*}{\sqrt{2}} & \dfrac{S_{3,k}^*}{\sqrt{2}} & \dfrac{-S_{1,k}-S_{1,k}^*+S_{2,k}-S_{2,k}^*}{2} \\ \dfrac{S_{3,k}^*}{\sqrt{2}} & -\dfrac{S_{3,k}^*}{\sqrt{2}} & \dfrac{S_{2,k}+S_{2,k}^*+S_{1,k}-S_{1,k}^*}{2} \end{bmatrix}, \quad (3)$$

where k=0, 1, . . . , N−1. The rows of the signal transmission matrix represent the time dimension, the columns represent the space dimension and the index k represents the frequency dimension or the corresponding sub-carrier. The transmitter 8 may create the matrix $S_k$ such that it is unitary. If the vectors of the training sequences are derived from the points along the unit circle in the complex domain then the signal transmission matrices $S_k$ shown in (1) and (2) are unitary. Besides making each of the transmission matrices $S_k$ unitary, it also facilitates the system implementation and maintains a low PAPR of the sequence structure in the time domain. This is because the signal transmission matrices in the training mode and the data mode are exactly alike, which further simplifies the system implementation. The transmission of a unitary matrix aids in parameter estimation, as is described below.

With reference again to FIG. 1, the L number of receiving antennas 20 receive the Q number of transmitted signals and provide the received signals to respective OFDM demodulators 22, which down-convert the signal back to baseband. The L number of receiving antennas 20 are separated by a distance such that the received signals have minimum correlation and are as independent from each other as possible. The outputs from the L number of OFDM demodulators 22 are input into a decoder 24, which combines the multiple signals and decodes them. In addition, the decoder 24 removes any correctable noise and distortion errors, as will be described below, and outputs signals representative of the original data.

Figure 7:
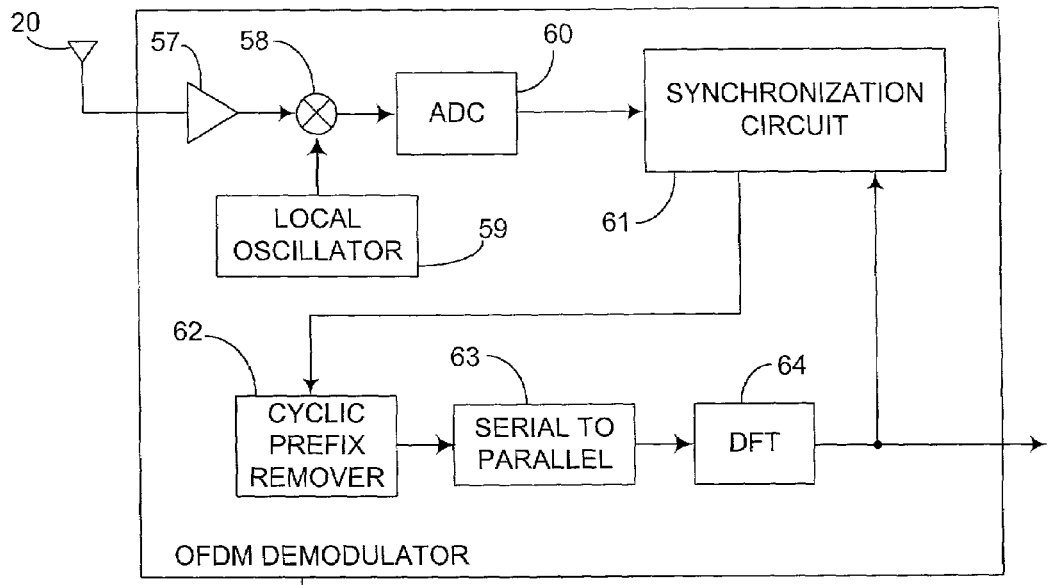
FIG. 7 is a block diagram illustrating an example embodiment of one of the OFDM demodulators shown in FIG. 1.

FIG. 7 illustrates an example embodiment of one of the OFDM demodulators 22 of the receiver 10. Received signals from the receiving antenna 20 are input into a pre-amplifier 57, which amplifies the received signals to a level at which further processing may be performed. The output of the pre-amplifier 57 is connected to a mixer 58. A local oscillator 59 provides a signal to the mixer 58 having a frequency designed to demodulate the received amplified signal. The demodulated signal is then output to an analog-to-digital converter (ADC) 60, which converts the analog signals into discrete time samples. The discrete time samples are applied to a synchronization circuit 61.

An explanation will now be made to emphasize the significance of synchronization in an OFDM system. OFDM typically requires substantial synchronization in time as well as in frequency in order that transmitted signals can be recovered with adequate accuracy. Time synchronization involves determining the best possible time for the start of the received frame to closely match the start of the transmitted signal.

Frequency synchronization involves maintaining orthogonality of the respective sub-carrier frequencies. Orthogonality refers to a condition of the sub-carrier frequencies wherein the "inner product" of the signals at different sub-carrier frequencies is zero. With respect to the inner product, reference is made, for example, to the time domain sequences $s_{1,n}$ wherein n=0, 1, . . . N−1 and the sub-carrier index k is equal to 1. When the sub-carrier index k is equal to 2, the time domain sequences $s_{2,n}$ are transmitted. The inner product is equal to $\Sigma(s_{1,n})^*(s_{2,n})$ wherein n=0, 1, . . . N−1. When the inner product is not equal to zero, a loss of sub-channel orthogonality may result, thereby causing Inter Carrier Interference (ICI). Since the sub-channels are separated by a precise frequency difference to maintain orthogonality, any difference in frequencies between the transmitter and the receiver local oscillators may cause a loss of sub-channel orthogonality. The synchronization circuit 61 corrects this loss of sub-channel orthogonality by finding an estimate of the difference between the frequencies of the local oscillators 46 of the transmitter 8 and the frequencies of the local oscillators 59 of the receiver 10. The synchronization circuit 61 further corrects these frequency difference estimates.

The synchronization circuit 61 will now be explained with reference to FIG. 8. The input to the synchronization circuit 61, connected to the output of the ADC 60, is input into a coarse time synchronization circuit 66 and a frequency offset correction circuit 74. The coarse time synchronization circuit 66 determines the approximate start time of each received block of N+G samples by estimating the approximate starting time of the OFDM frame. The coarse time synchronization circuit 66 sends the coarsely synchronized signals to a first frequency offset estimation circuit 68. The coarse time synchronization circuit 66 sends a second output to the frequency offset correction circuit 74 and a third output back to the pre-amplifier 57 for altering the gain of the pre-amplifier 57.

The first frequency offset estimation circuit 68 estimates the frequency offset to within one-half of the sub-carrier spacings. An output from the first frequency offset estimation circuit 68 is sent to the frequency offset correction circuit 74. At this stage, the frequency offset correction circuit 74 performs an initial correction of the frequency offset, utilizing the signals received from the ADC 60, coarse time synchronization circuit 66, and the first frequency offset estimation circuit 68. The frequency offset correction circuit 74 sends the initial frequency corrected samples to a cyclic prefix remover 62, which is shown in FIG. 7. The cyclic prefix remover 62 removes the cyclic prefixes from the frames and sends the symbols, with the cyclic prefixes removed, to a serial-to-parallel converter 63. The serial-to-parallel converter 63 converts the serial stream to a parallel format and sends the parallel data to a Discrete Fourier Transform (DFT) stage 64. The DFT stage 64 converts the time domain samples to the frequency domain, and returns an output to the synchronization circuit 61 to refine the synchronization in the time and frequency domain.

With reference again to FIG. 8, the output from the DFT 64 travels to a second frequency offset estimation circuit 70 and a fine time synchronization circuit 72. The second frequency offset estimation circuit 70 receives the estimation of the frequency offset to within one-half the sub-carrier spacing form the first frequency offset estimation circuit 68 and the frequency domain samples from the DFT 64. Using these input signals, the second frequency offset estimation circuit 70 provides an estimation of the frequency offset to an integer multiple of sub-carrier spacings.

The second frequency offset estimation circuit 70 provides an output to the local oscillator 59 for adjusting the frequency of the local oscillator 59 to the frequency of the local oscillator 46 of the transmitter 8. The second frequency offset estimation circuit 70 sends a second output to the frequency offset correction circuit 74, which may further correct the frequency offset during a second stage, based on the offset estimated by the second frequency offset estimation circuit 70. Both the frequency offset correction circuit 74 and the second frequency offset estimation circuit 70 send outputs to the fine time synchronization circuit 72, which calculates a more accurate start time of the received frame. Outputs from the frequency offset correction circuit 74 and fine time synchronization circuit 72 are sent to the cyclic prefix remover 62, which receives the signals that are further synchronized during the second stage of the synchronization circuit 61.

The synchronization circuit 61 may be utilized as many times as necessary to accurately synchronize the receiver 10 in the time and frequency domains. The known calibration values may be transmitted by the transmitter 8 for an amount of time until the synchronization circuit 61 has developed an accurate correction to compensate for time variations and frequency offsets that may be inherent in the communication system 6 and channel 19. Once adequate synchronization has been obtained, frames carrying the user's data symbols may be transmitted with confidence that time and frequency synchronization will allow acceptable reception of the transmitted signals. With synchronization maintained, newly received symbols sent to the synchronization circuit 61 may bypass the synchronization and estimation circuits and pass through the frequency offset correction circuit 74 to synchronize the new symbols. Therefore, as time passes, the synchronization circuit 61 may make slight adjustments to account for any changes in the communication system 6, but may reach a steady state when the communication system 6 does not change.

The individual circuits of the synchronization circuit 61 will now be explained with reference to FIGS. 9A, 9B, 10, 11 and 12. The coarse time synchronization circuit 66 determines the approximate start time of each received block of N+G samples. The coarse time synchronization circuit 66 may use circuitry which takes into account the periodicity inserted into the training symbol, or in other words, the periodic occurrences of the inserted cyclic prefixes in the data frame. The coarse time synchronization circuit 66 detects the location of the cyclic prefixes by observing the repetitious nature of the G samples. To reiterate, the G samples repeat a portion of the N samples, as explained above.

The coarse time synchronization circuit 66 may comprise circuitry capable of performing a technique that is hereinafter referred to as "auto-correlation." The phase output from the auto-correlation circuit may be used in the example embodiment of the first frequency offset estimation circuit 68, as is described in more detail below. The technique of auto-correlation is accomplished by comparing the samples of a data stream with samples of the same data stream that are delayed by the number of samples $N_I$.

An example embodiment of an auto-correlation circuit 75 is shown in FIG. 9A. A received frame is demodulated into a data stream $r_n$, which is input into a mixer 76 and a delay circuit 77. The delay circuit 77 delays the data stream by $N_I$ samples such that a second input into the mixer 76 will be offset by $N_I$ samples. The delayed data stream is processed by a complex conjugation circuit 78, which outputs the processed data stream to the second input of the mixer 76.

The mixer 76 compares the data stream $r_n$ with the delayed and processed data stream. Since the delayed data stream is delayed by $N_I$ samples, the mixer compares the start of the preamble at the first G sample with a sample that is delayed $N_I$ from the start of the preamble. If the comparison between the data stream $r_n$ and the delayed data stream reveals an alignment of the G samples of the cyclic prefix with the last G samples of the training symbol $N_I$, then the mixer 76 outputs a constructively added waveform. The output of the mixer 76 is input into a summing circuit 79, which sums the output of the mixer 76 over G samples and provides the magnitude and phase of the sum. The auto-correlation operation can be represented using the equation:

$$\phi_n = \sum_{k=0}^{G-1} r^*_{n+k} \cdot r_{n+k+N_I}$$

where the coarse time synchronization is achieved when $\phi_n$ attains a certain threshold value.

In addition to auto-correlation, the coarse time synchronization circuit 66 may also correct any undesirable fluctuations in the amplitude of the signals received by the receiver 10. Signals experiencing long-term amplitude fluctuations may be corrected by an automatic gain control (AGC) circuit, which may be part of the coarse time synchronization circuit 66. The AGC circuit may detect variations in the signal amplitudes and provide feedback signals to the pre-amplifier 57 in order to maintain the received signals at a constant magnitude.

As shown in FIG. 9B, an embodiment of an AGC circuit 80 comprises an instantaneous energy calculator 82, which calculates the instantaneous energy using the formula:

$$p_n = \sum_{k=0}^{G-1} r^*_{n+k+N_I} r_{n+k+N_I}$$

An average of this instantaneous energy is taken over a period of time by a time averaging circuit 84 and given to the pre-amplifier 57 to correct the long term fluctuations in the amplitude of the received signal. The time averaging circuit can be represented using a formula such as:

$$P_{avg} = \frac{1}{M} \sum_{n=1}^{M} P_n,$$

where M can be any number large enough to average long term fluctuations in the OFDM signal. For example, M may be equal to 10(N+G).

Furthermore, the coarse time synchronization circuit 66 corrects short-term fluctuations in the signals by utilizing the training symbols, pilot symbols, and the instantaneous energy value $p_n$ generated by the AGC circuit 80. After the coarse time synchronization circuit 66 determines an approximate starting time, a more precise time synchronization is achieved by utilizing the fine time synchronization circuit 72, which preferably follows in sequence after a frequency offset estimation operation, as will be described below.

In addition to the feedback signal to the pre-amplifier 57, the coarse time synchronization circuit 66 outputs the coarsely synchronized signals to the first frequency offset estimation circuit 68 (FIG. 8) for carrying out the first step of frequency offset estimation and correction. In accordance with the present invention, frequency synchronization is preferably carried out in two steps. The first frequency offset estimation circuit 68 estimates any frequency offset of ±I/2 sub-carrier spacings where I=N/N$_I$ and N$_I$ is the length of the periodic sequence. In the simplest case, N$_I$=N and the first frequency offset estimation circuit 68 can correct frequency offset of one sub-carrier spacing. This frequency offset is derived from the phase output from the auto-correlation circuit 75, when the auto-correlation reaches its peak or crosses a certain predetermined threshold.

An example embodiment of the first frequency offset estimation circuit 68 is illustrated in FIG. 10. The phase output from the auto-correlation circuit 75 is input into an offset estimation circuit 86. The offset estimation circuit 86 estimates the frequency offset using a formula that may be expressed by:

$$\gamma = \frac{N}{2\pi N_I} \theta$$

If the range of the first frequency offset estimation circuit 68 is not large enough, then the frequency offset estimation has to be performed in two stages. The first frequency offset estimation circuit 68 estimates the fractional portion of the frequency offset.

The frequency offset of the integer multiples of the subcarrier spacings is performed by the second frequency offset estimation circuit 70 by performing a cyclic cross-correlation in the frequency domain. The cyclic cross-correlation is made possible by the fact that the training sequence structure is designed such that the same sequence is transmitted from all the transmitting antennas 18 in the first training symbol period. The second frequency offset estimation circuit 70 receives feedback from the output of a Discrete Fourier Transform (DFT) stage 64 (FIG. 7), which converts the signal into the frequency domain, and is compared (cross-correlated) with the training symbol that was transmitted. If there is any residual frequency offset of an integer multiple of sub-carrier spacings, then the peak of the cross-correlation function will have shifted by an appropriate number of sub-carriers. Otherwise the peak will be at zero frequency. This residual frequency offset estimate is then applied to the frequency offset correction circuit 74 to correct the residual offset. The second frequency offset estimation circuit 70 can also be used to provide a feedback signal to correct and adjust the frequency of the local oscillator 59.

Figure 8:
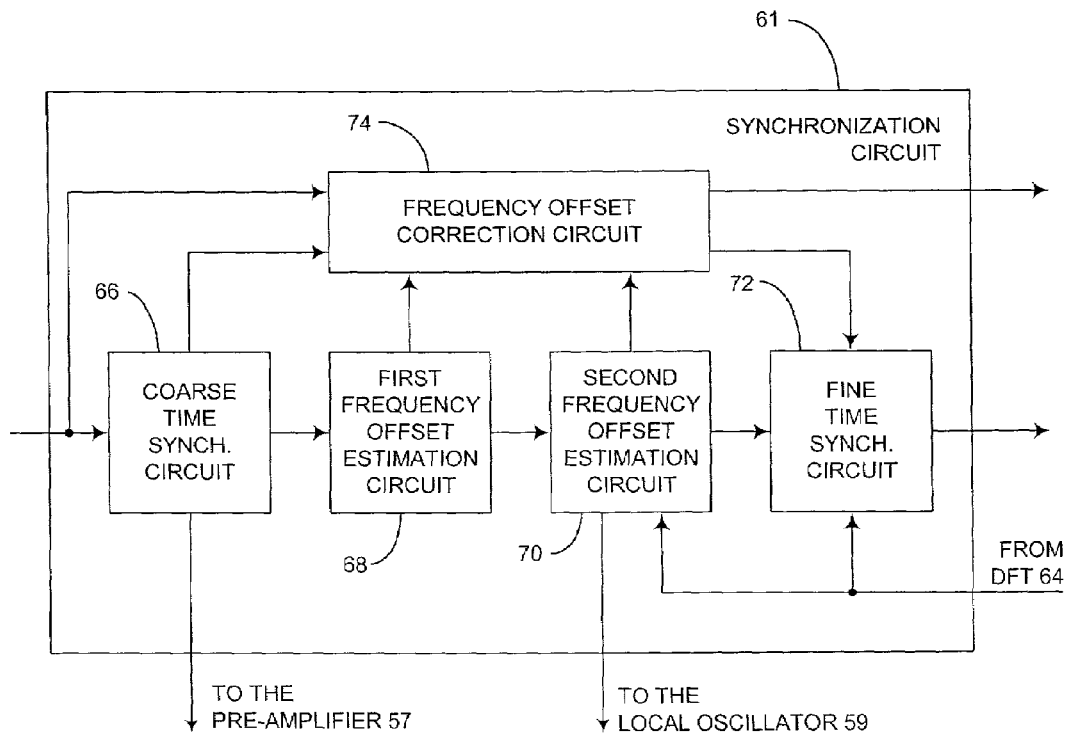
FIG. 8 is a block diagram illustrating an example embodiment of the synchronization circuit shown in FIG. 7.
Figure 11:
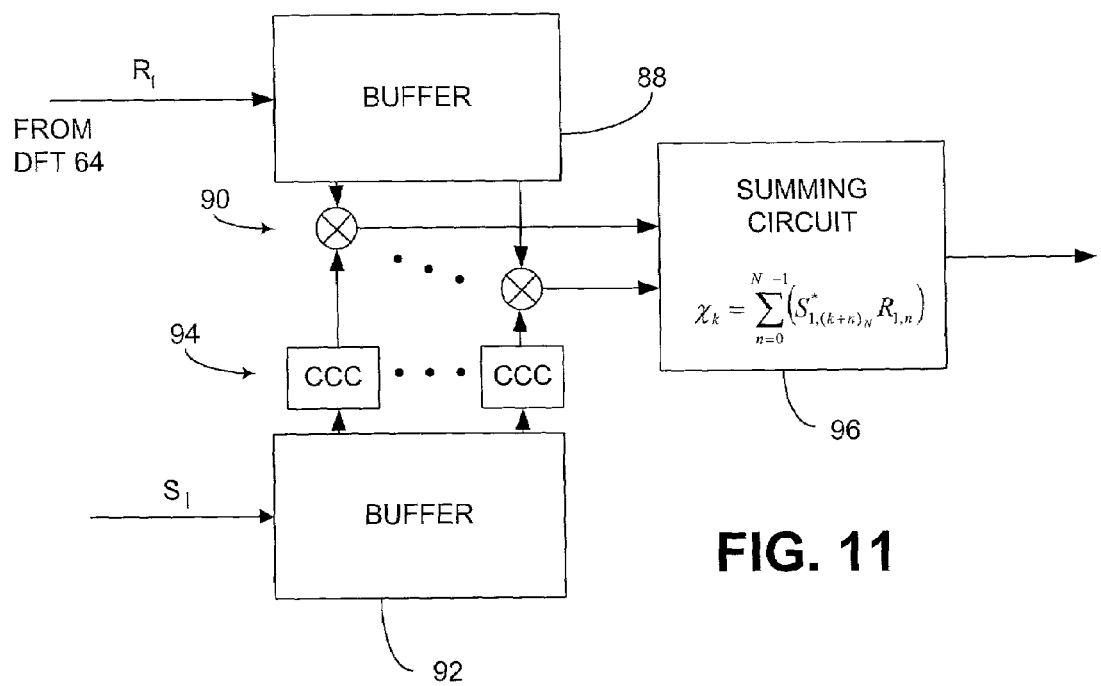
FIG. 11 is a block diagram illustrating an example embodiment of the fine time synchronization circuit shown in FIG. 8.

FIG. 11 illustrates an example of an embodiment of the way in which the second frequency offset estimation circuit 70 shown in FIG. 8 can be configured. An output from the DFT 64 is input as a frequency domain received symbol R$_I$ to a buffer 88, which stores in memory N samples. Outputs from the buffer 88 are input into N mixers 90. Sequences S$_I$ from the first frequency offset estimation circuit 68 are input into another buffer 92, which stores the sequence S$_I$ having a length of N samples. Sequence S$_I$ is constructed by first repeating the sequence s$_I$ in the time domain I times and then taking an N-point FFT of the repeated sequence. Outputs from the buffer 92 are input into complex conjugation circuits (CCCs) 94 for performing complex conjugation operations. The outputs of the CCCs 94 are input into second inputs into the mixers 90, which mixes the two sets of inputs. The outputs from the mixers 90 are sent to a summing circuit 96, which provide a function having the equation:

$$\chi_k = \sum_{n=0}^{N-1} \left( S^*_{I,(k+n)_N} R_{1,n} \right) \quad k = 0, 1, \ldots, N-1,$$

where $(k+n)_N$ represents the modulo-N or the remainder operation such that if k+n=N, then $(k+n)_N$=0 and if k+n=N+1, then $(k+n)_N$=1. Hence, the buffer 92 circularly shifts the sequence N times and calculates the values of χ from k=0 to N−1. The index k at which χ achieves its maximum gives the frequency offset estimate of the integral number of sub-carrier spacings.

The output from the summing circuit 96 is sent to the frequency offset correction circuit 74 (FIG. 8), the fine time synchronization circuit 72, and the local oscillator 59. In response to this output, the frequency offset correction circuit 74 further corrects the frequency difference to synchronize the frequency with respect to the integer multiples. The local oscillator 59 responds by adjusting the sub-carrier frequency to minimize the frequency offset.

The frequency offset correction circuit 74 receives the estimates of the frequency offset from the first frequency offset estimation circuit 68 and the second frequency offset estimation circuit 70. In response to the estimates in the frequency offset, the frequency offset correction circuit 74 can correct the frequency offset in discrete time or partly in discrete time and partly by sending the correction factor to the local oscillator 59.

Fine time synchronization can then be achieved by using the fine time synchronization circuit 72 to find the start of the useful portion of the OFDM block to within a few samples. Fine time synchronization can be performed by cross-correlating the transmitted training symbols with the received frequency offset corrected signals from the frequency offset correction circuit 74 and by recognizing a predetermined pattern. If different sequences are transmitted from different antennas, then Q such correlation circuits are needed and the magnitudes of their outputs are summed together. The peak of the summed magnitudes will indicate the fine time synchronization instant. In the example of the transmission matrix structure provided in equations (1) and (2), the same sequence is transmitted from all the transmitting antennas 18 in the first OFDM symbol period. Hence, for this case, only one such correlation circuit is required and the sequence that is stored in the buffer is the time domain counterpart of the sequence $S_1$.

If deemed desirable, sequences with special properties can be transmitted from each antenna to further enhance the performance of the fine time synchronization circuit 72. These properties could include the orthogonal nature of the transmitted sequences or any other variation on the sequences to be transmitted from different antennas.

Figure 12:
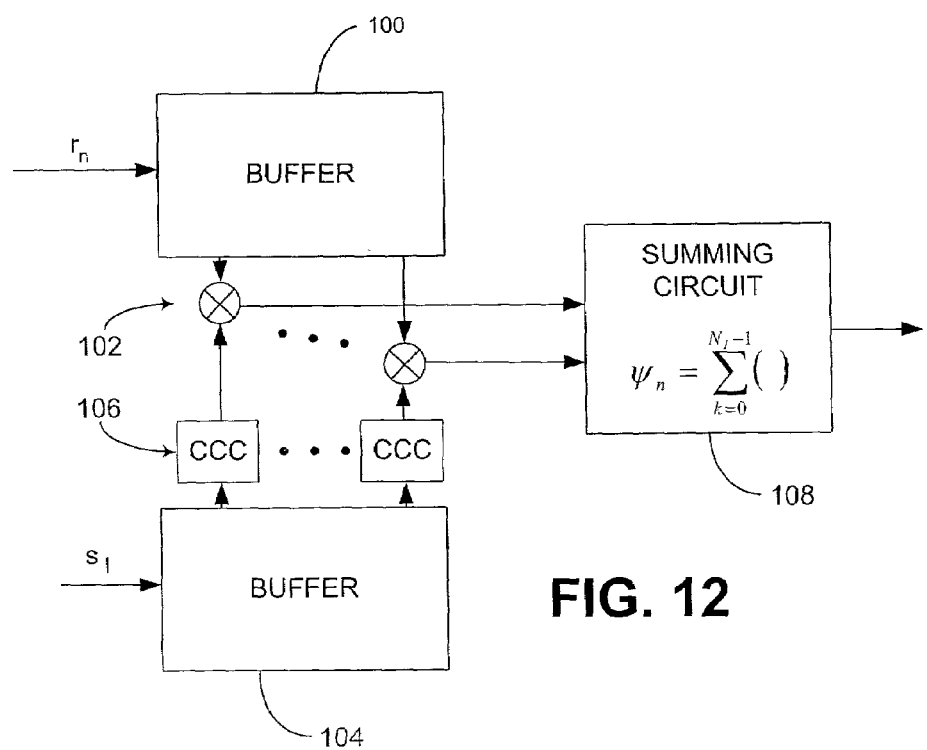
FIG. 12 is a block diagram illustrating an example embodiment of the second frequency offset estimation circuit shown in FIG. 8.

FIG. 12 illustrates an example embodiment of the fine time synchronization circuit 72. In FIG. 12, a buffer 100 comprises a memory device for storing $N_I$ samples. The buffer 100 receives the received samples $r_n$ from the second frequency offset estimation circuit 70. A second buffer 104 stores the time domain sequence $s_I$ having the length $N_I$, wherein $S_I$ is the replica of the original transmitted sequence or a semblance of the transmitted sequence $s_1$. Each output from the buffer 100 is input into a first input of a number of $N_I$ mixers 102. The outputs from the buffer 104 are input into a number of $N_I$ CCCs 106, which perform complex conjugate operations on the outputs from buffer 104. Each output from the CCCs 106 is input into a second input of the $N_I$ mixers 102. The $N_I$ number of combined signals from the mixers 102 are input into a summing circuit 108, which sums the combined signals using equation:

$$\psi_n = \sum_{k=0}^{N_I-1} s_k^* \cdot r_{n+k}.$$

Fine time synchronization is achieved at a time instant n when the function ψ attains a value greater than a predetermined threshold. The output from the summing circuit 108 represents the output of the synchronization circuit 61 and is sent to a cyclic prefix remover 62 (FIG. 7).

The performance of the fine time synchronization circuit 72 is dependent on the frequency offset estimation and correction. Presence of any frequency offset hampers the performance of the fine time synchronization circuit 72. When no frequency offset exists, the timing information may be derived directly from the coarse time synchronization circuit 66. Also, coarse time synchronization can be modified to provide better estimates by averaging the results of the coarse time synchronization circuits from different OFDM demodulators and over different times. The fine time synchronization circuit 72 provides an optimal time instant of the start of the received OFDM frame.

The communication system 6 may either employ L such synchronization circuits 61, one for each OFDM demodulator 22 or it may employ certain parts of the synchronization circuit for all the OFDM demodulators 20 and certain parts that are common to the entire receiver 10. For example, the OFDM modulators 22 may include individual time synchronization circuits 66 and 72 and frequency offset correction circuit 74, but may share common frequency offset estimation circuits 68 and 70. Alternatively, the receiver 10 may simply comprise a single synchronization circuit 61.

Reference will now be made again to FIG. 7. Once the fine time synchronization circuit 72 achieves fine time synchronization, the frequency and time synchronized information is provided to the cyclic prefix remover 62, which removes the cyclic prefixes inserted between each block of N symbols. The blocks of N samples are then serial-to-parallel converted using serial-to-parallel converter 63 and the parallel signals are input to the DFT stage 64, which converts the time domain samples back to the frequency domain, thus completing synchronization and demodulation by the OFDM demodulators 22.

Figure 13:
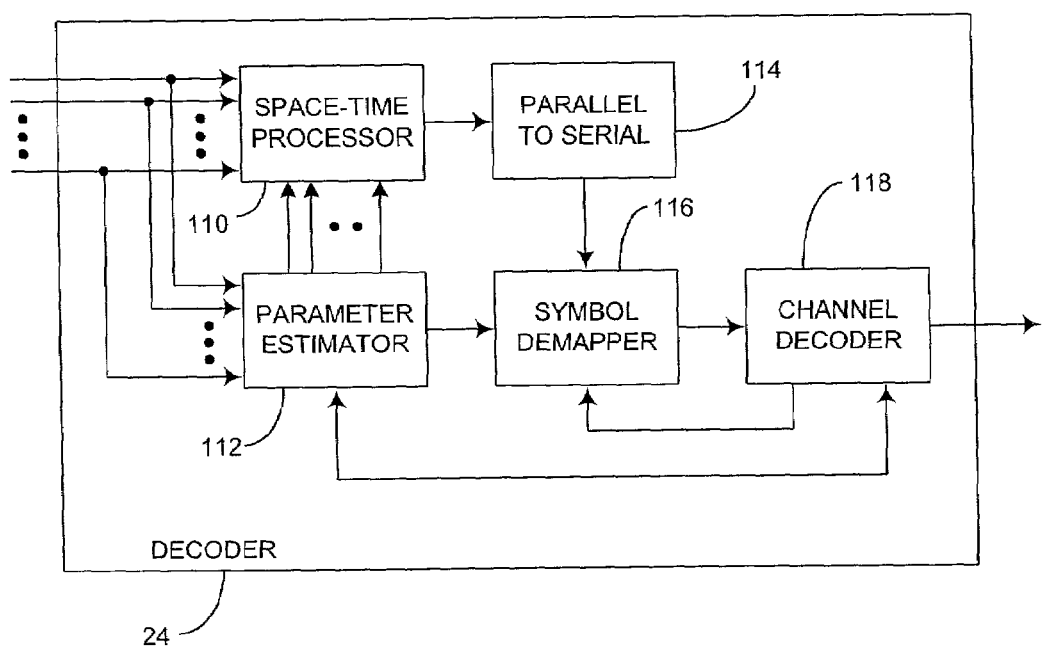
FIG. 13 is a block diagram illustrating an example embodiment of the decoder shown in FIG. 1.

Referring again to FIG. 1, the L number of demodulated signals from each of the L number of OFDM demodulators 22 are then input into the decoder 24, which processes the demodulated signals. The decoder 24 may be configured in the manner shown in the example embodiment of FIG. 13. The decoder 24 comprises a space-time processor 110 and a parameter estimator 112. Both the space-time processor 110 and parameter estimator 112 receive the signals from each of the L number of OFDM demodulators 22.

An output from the parameter estimator 112 is input into a symbol demapper 116 and a set of outputs is input into the space-time processor 110. The output of the space-time processor 110 is converted from parallel to serial by a parallel-to-serial converter 114 and then input to the symbol demapper 116, which maps the symbols from the predetermined alphabet back to the data bits. The output from the symbol demapper 116 is input into a channel decoder 118. The channel decoder 118 decodes the data symbols by checking the parity that was added to the symbols prior to transmission. Thus, the channel decoder 118 detects and corrects errors in the data symbols and outputs the data in its original form. There can be an exchange of information between the parameter estimator 112, symbol demapper 116 and channel decoder 118 to create a feedback loop. If the channel decoder 118 detects too many errors in the training symbol such that correction of the errors is no longer possible, then an "excessive-error" indication is made to the parameter estimator 112, which adjusts and corrects its estimates.

The communication system 6 of the present invention, including the synchronization circuit 61, can be implemented in hardware, software, firmware, or a combination thereof. In the embodiments of the present invention, the communication system 6 can be implemented in software or firmware that is stored in a memory and that is executed by a suitable instruction execution system. If implemented in hardware, as in an alternative embodiment, the synchronization system can be implemented with any or a combination of the following technologies, which are all well known in the art: a discrete logic circuit having logic gates for implementing logic functions upon data signals, an application specific integrated circuit (ASIC) having appropriate combinational logic gates, a programmable gate array (PGA), a field programmable gate array (FPGA), digital signal processor (DSP), etc.

It should be emphasized that the above-described embodiments of the present invention are merely possible examples of implementations, merely set forth for a clear understanding of the principles of the invention. Many variations and modifications may be made to the above-described embodiments of the invention without departing substantially from the principles of the invention. All such modifications and variations are intended to be included herein within the scope of this disclosure and protected by the following claims.

We claim:

1. An apparatus for synchronizing a Multi-Input, Multi-Output (MIMO) Orthogonal Frequency Division Multiplexing (OFDM) system, the apparatus comprising:
a number (Q) of OFDM modulators, each OFDM modulator producing a frame comprising at least one inserted symbol, a plurality of data symbols, and cyclic prefixes;
Q transmitting antennas, each transmitting antenna connected to a respective OFDM modulator, for transmitting said frame over a channel;
a number (L) of receiving antennas for receiving the transmitted frames; and
L OFDM demodulators, each OFDM demodulator corresponding to a respective receiving antenna, the L OFDM demodulators comprising a synchronization circuit, which processes the received frame in order to synchronize the received frame in a time domain and frequency domain;
wherein the synchronization circuit comprises a first portion that includes individual circuits such that each individual circuit is used exclusively by a respective OFDM demodulator, and a second portion that includes circuits that are shared by all of the L OFDM demodulators.

2. The apparatus of claim 1, wherein the cyclic prefixes protect the data symbols against Inter Symbol Interference (ISI).

3. The apparatus of claim 1, wherein the at least one inserted symbol has at least one pilot symbol inserted within the data symbols or at least one training symbol inserted at the beginning of the frame.

4. The apparatus of claim 1, wherein the synchronization circuit comprises a circuit for finding the optimum time instant of the start of the demodulated frame.

5. The apparatus of claim 4, wherein the synchronization circuit comprises a coarse time synchronization circuit and a fine time synchronization circuit.

6. The apparatus of claim 5, wherein the coarse time synchronization circuit comprises a circuit for performing auto-correlation on the received frame over a particular window.

7. The apparatus of claim 5, wherein the coarse time synchronization circuit comprises a circuit for performing an automatic gain control operation.

8. The apparatus of claim 1, wherein each of the Q OFDM modulators comprises a transmitting local oscillator, each of the L OFDM demodulators comprises a receiving local oscillator, and the synchronization circuit comprises a first frequency offset estimation circuit and a second frequency offset estimation circuit for estimating the frequency difference between the transmitting local oscillator and the receiving local oscillator.

9. The apparatus of claim 8, wherein the second frequency offset estimation circuit is used to correct the frequency of the receiving local oscillator.

10. The apparatus of claim 8, wherein said synchronization circuit further comprises a frequency offset correction circuit that utilizes the estimates from said second frequency offset estimation circuit and said first frequency offset estimation circuit to correct the frequency offset in discrete time.

11. The apparatus of claim 1, wherein each of the Q OFDM modulators share a common transmitting local oscillator, each of the L OFDM demodulators share a common receiving local oscillator, and the synchronization circuit comprises first and second frequency offset estimation circuits for estimating the frequency difference between the transmitting local oscillator and the receiving local oscillator.

12. The apparatus of claim 1, wherein Q is equal to L.

13. The apparatus of claim 12, wherein Q is equal to one.

14. The apparatus of claim 1, wherein Q equals two.

15. The apparatus of claim 1, wherein Q is not equal to L.

16. The apparatus of claim 1 further comprising an OFDM encoder, wherein the OFDM encoder comprises:
a channel encoder;
a symbol mapper connected to an output of the channel encoder;
a space-time processor connected to an output of the symbol mapper, the space-time processor separating data into a plurality of sub-channels; and
a pilot/training symbol inserter, which inserts pilot symbols and training symbols onto the sub-channels.

17. The apparatus of claim 1, wherein each of the Q OFDM modulators comprises:
a serial-to-parallel converter;
an inverse discrete Fourier transform (IDFT) stage connected to an output of the serial-to-parallel converter;
a cyclic prefix inserter connected to an output of the IDFT stage;
a parallel-to-serial converter connected to an output of the cyclic prefix inserter;
a digital-to-analog converter (DAC) connected to an output of the parallel-to-serial converter;
a local oscillator;
a mixer having a first input and a second input, the first input connected to an output of the DAC, the second input connected to an output of the local oscillator; and
an amplifier connected to an output of the mixer.

18. The apparatus of claim 1, wherein each of the L OFDM demodulators comprises:
a pre-amplifier;
a local oscillator;
a mixer having a first input and a second input, the first input connected to an output of the pre-amplifier, the second input connected to an output of the local oscillator;
an analog-to-digital converter (ADC) connected to an output of the mixer;
the synchronization circuit, having one input connected to an output of the ADC;
a cyclic prefix remover connected to an output of the synchronization circuit;
a serial-to-parallel converter connected to an output of the cyclic prefix remover; and
a discrete Fourier transform (DFT) stage connected to an output of the serial-to-parallel converter, an output of the DFT stage connected to another input to the synchronization circuit.

19. The apparatus of claim 1, wherein the L OFDM demodulators share a single synchronization circuit.

20. The apparatus of claim 1, wherein each OFDM demodulator uses one of L synchronization circuits.

21. The apparatus of claim 1, wherein the second portion comprises a first frequency offset estimator circuit and a second frequency offset estimator circuit, and the first portion comprises a coarse time synchronization circuit, a fine time synchronization circuit, and a frequency offset correction circuit.

22. The apparatus of claim 1, wherein the second portion comprises a coarse time synchronization circuit, a first frequency offset estimator circuit, and a second frequency offset estimator circuit, and the first portion comprises a fine time synchronization circuit and a frequency offset correction circuit.

23. The apparatus of claim 1, wherein the first portion comprises coarse time synchronization circuits wherein the results of the different coarse time synchronization circuits are shared by the different OFDM demodulators.

24. The apparatus of claim 1 further comprising an OFDM decoder, wherein the OFDM decoder comprises:
a space-time processor that receives an output from each of the L OFDM demodulators;
a parameter estimator that receives an output from each of the L OFDM demodulators and estimates parameters of the channel;
a parallel-to-serial converter connected to an output of the space-time processor;
a symbol demapper having a first input and second input, the first input connected to an output of the parameter estimator, the second input connected to an output of the parallel-to-serial converter; and
a channel decoder connected to an output of the symbol demapper.

25. A synchronization circuit, incorporated within a demodulator of a Multi-Input, Multi-Output (MIMO) Orthogonal Frequency Division Multiplexing (OFDM) system, wherein the synchronization circuit comprises:
a coarse time synchronization circuit;
a first frequency offset estimation circuit connected to a first output of the coarse time synchronization circuit;
a second frequency offset estimation circuit connected to a first output of the first frequency offset estimation circuit;
a fine time synchronization circuit having a first input connected to a first output of the second frequency offset estimation circuit; and
a frequency offset correction circuit having inputs connected to second outputs of the coarse time synchronization circuit, first frequency offset estimation circuit, and second frequency offset estimation circuit, and having an output connected to a second input to the fine time synchronization circuit.

26. The apparatus of claim 25, wherein the coarse time synchronization circuit is an auto-correlation circuit that comprises:
a delay circuit that receives a stream of data samples of a received frame;
a complex conjugation circuit connected to an output of the delay circuit;
a mixer having a first input and a second input, the first input receiving the stream of data samples, the second input connected to an output of the complex conjugation circuit; and
a summing circuit connected to an output of the mixer.

27. The apparatus of claim 25, wherein the first frequency offset estimation circuit comprises an offset correction circuit.

28. The apparatus of claim 25, wherein the second frequency offset estimation circuit is a cross-correlation circuit in a frequency domain that comprises:

a first buffer that receives and stores a portion of a stream of data samples from a Discrete Fourier Transform (DFT) stage, the first buffer having a plurality of outputs;
a second buffer that receives and stores a portion of a stream of data samples in the frequency domain from a transmitted sequence, the second buffer having a plurality of outputs;
a plurality of complex conjugation circuits connected to the plurality of outputs of the second buffer;
a plurality of mixers, each mixer having a first input and a second input, the first inputs connected to the outputs of the first buffer, the second inputs connected to outputs of the complex conjugation circuits; and
a summing circuit that sums the outputs of the mixers.

29. The apparatus of claim 25, wherein the fine time synchronization circuit is a cross-correlating pattern recognition circuit that comprises:
a first buffer that receives and stores a portion of a stream of data samples of a received frame, the first buffer having a plurality of outputs;
a second buffer that receives and stores a portion of a transmitted sequence in a time domain, the second buffer having a plurality of outputs;
a plurality of complex conjugation circuits connected to the plurality of outputs of the second buffer;
a plurality of mixers, each mixer having a first input and a second input, the first inputs connected to the outputs of the first buffer, the second inputs connected to outputs of the complex conjugation circuits; and
a summing circuit that sums the outputs of the mixers.

30. A method for synchronizing a Multi-Input Multi-Output (MIMO) Orthogonal Frequency Division Multiplexing (OFDM) system in time and frequency domains, the method comprising the steps of:
producing a frame of data comprising a training symbol that includes a synchronization component that aids in synchronization, a plurality of data symbols, and a plurality of cyclic prefixes;
transmitting the frame over a channel;
receiving the transmitted frame;
demodulating the received frame;
synchronizing the received demodulated frame to the transmitted frame such that the data symbols are synchronized in the time domain and frequency domain;
wherein the synchronizing in the time domain comprises coarse time synchronizing and fine time synchronizing.

31. The method of claim 30, wherein the synchronizing in the time domain includes averaging estimates over a period of time.

32. The method of claim 30, wherein the synchronizing in the frequency domain comprises estimating a frequency offset.

33. The method of claim 32, wherein the step of estimating the frequency offset comprises estimating the frequency offset to within one half of the sub-carrier spacing.

34. The method of claim 33, wherein the step of estimating the frequency offset further comprises the steps of:
repeating received samples of the received frame a number of times;
taking an N-point Fast Fourier Transform (FFT); and
performing a cross-correlation procedure in the frequency domain.

35. The method of claim 32, wherein the step of estimating the frequency offset comprises averaging the estimates over a number of frames, thereby improving the estimates.

36. The method of claim 32, wherein the step of estimating the frequency offset comprises taking the estimates from a number of different OFDM demodulators and averaging the estimates, thereby improving the estimates.

37. The method of claim 30, wherein the transmitting step includes transmitting the symbols from at least two antennas.

38. The method of claim 30, wherein the step of producing further comprises producing said training symbol with an orthogonal sequence, thereby enhancing a fine time synchronization performance.

39. The method of claim 30, wherein the step of producing further comprises adjusting the periodicity of the training symbol, thereby increasing the range of frequency offset estimation.

40. The method of claim 30, wherein the synchronization component aids in synchronization and in an estimation of channel parameters.

41. The method of claim 30, wherein the synchronization component comprises a preamble of a generalized length having a number of OFDM symbols less than a number of transmitting antennas.

42. The method of claim 30, wherein the synchronization component comprises a preamble of a generalized length having a number of OFDM symbols equal to a number of transmitting antennas.

43. The method of claim 30, wherein the synchronization component comprises a preamble of a generalized length having a number of OFDM symbols greater than a number of transmitting antennas.

44. The method of claim 30, wherein the synchronization component comprises a preamble whose signal transmission matrix resembles an existing space-time block code.

45. The method of claim 30, wherein the synchronization component includes chirp-like sequences.

46. The method of claim 45, wherein the chirp-like sequences include at least one of Frank-Zadoff sequences, Chu sequences, Milewski sequences, Suehiro polyphase sequences, and Ng et al. sequences.

47. The method of claim 30, wherein the step of producing a frame comprises producing the cyclic prefixes in a preamble and in the data symbols such that the cyclic prefixes in the preamble are longer than the cyclic prefixes in the data symbols, thereby countering an extended channel impulse response and improving synchronization.

48. The method of claim 30, further comprising the step of altering the training symbol to enhance the synchronization performance.

49. The method in claim 30, wherein the coarse time synchronizing includes averaging the coarse time synchronized results over time.

50. The method of claim 30, further comprising the steps of:

generating an N-point representation of the transmitted sequence in the frequency domain;

repeating the time domain sequence a number of times; and taking an N-point Fast Fourier Transform.

51. The method of claim 30, wherein the step of producing comprises producing a preamble whose signal transmission matrix resembles an existing space-time block code.

\* \* \* \* \*